Patented Sept. 12, 1922.

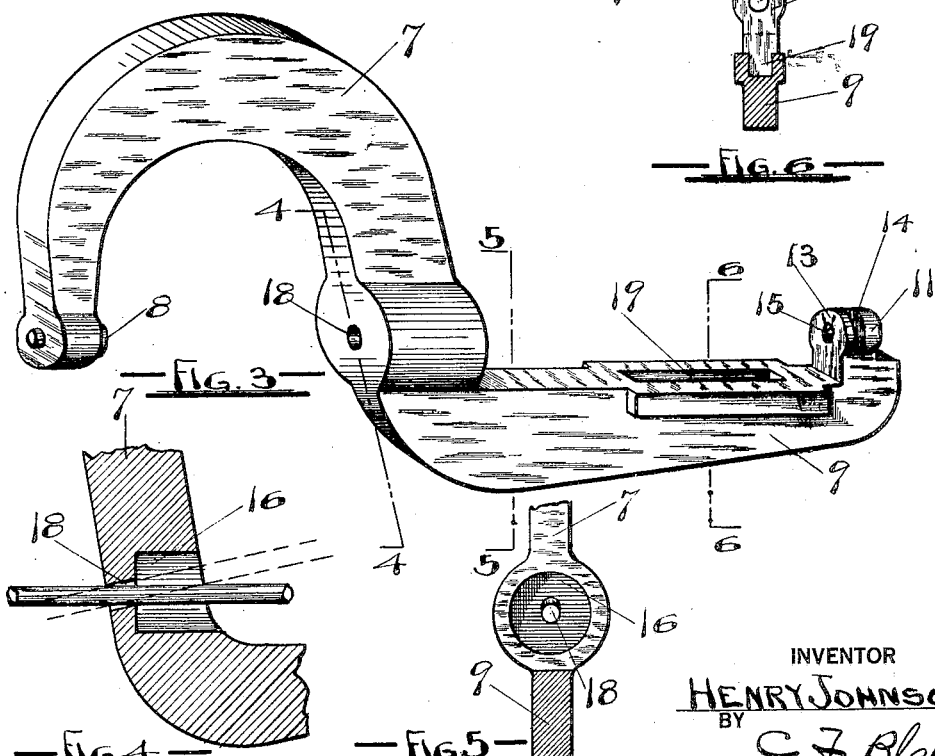

1,428,781

UNITED STATES PATENT OFFICE.

HENRY JOHNSON, OF PORTLAND, OREGON.

MICROMETER ADAPTER.

Application filed January 5, 1921. Serial No. 435,115.

*To all whom it may concern:*

Be it known that I, HENRY JOHNSON, a citizen of the United States, residing at Portland, county of Multnomah, State of Oregon, have invented certain new and useful Improvements in Micrometer Adapters, of which the following is a specification.

My invention relates to micrometers in general, and particularly to micrometer calipers, the object being to provide a device upon which may be mounted an inside micrometer caliper which may then be used as an outside micrometer caliper.

I accomplish the above object by means of the construction illustrated in the accompanying drawing, which is a part of this application for Letters Patent, like characters of reference indicating like parts throughout the several views thereof, and in which:

Fig. 1 is a side elevation of my device with an inside micrometer caliper mounted thereon.

Fig. 2 is a plan view of my device.

Fig. 3 is a perspective view of my device.

Figs. 4, 5 and 6 are sectional elevations upon the lines 4—4, 5—5, and 6—6 respectively of Fig. 3.

In general my device consists of a U shaped yoke with a stud in one end thereof adapted to coact with the stem of the inside micrometer caliper to form an outside micrometer caliper device, an arm upon said yoke, and an adjustable stud upon said arm adapted to contact with the end of the inside micrometer caliper.

The yoke 7 is of the form usually employed in ordinarly outside micrometer calipers, and a stud 8 is mounted upon the outer end of said yoke. An arm 9 extends from said yoke substantially parallel to the axis of said stud 8, and upon the extremity of said arm is mounted an adjustable stud 10.

Said stud 10 is threaded into a boss 11 upon the arm 9 and is locked in position by a lock nut 12.

A boss 13 is formed upon the arm 9 adjacent the boss 11 and parallel thereto, a space 14 being provided therebetween. The boss 13 is bored as at 15 to receive the end of the inside micrometer caliper, said end contacting with the end of the stud 10 within the space 14, as shown in Fig. 1.

A cylindrical orifice 16 is provided in the yoke 7, said orifice being coaxial with the studs 8 and 10, and a spring 17 is mounted upon the stem of the inside micrometer caliper and disposed so that one end thereof is within said orifice 16 and the other end thereof against the end of the barrel of the inside micrometer caliper, as shown in Fig. 1 thereby pressing the end of said inside micrometer caliper against the stud 10.

An orifice 18 alined with orifice 16 and with studs 8 and 10 is provided in the yoke 7, through which orifice 18 the stem of the inside micrometer caliper projects. A groove 19 is also provided in the arm 9 to receive one of the studs 20 of the inside micrometer caliper, as shown in Fig. 1, and thus prevent the latter from rotation as it is being used.

It is necessary to tilt the inside micrometer caliper relatively to the arm 9 as the former is inserted into the device, and for this reason the orifice 18 is bored upon a slant relatively to the axis of the studs 8 and 9, as shown in Fig. 4, and the diameter of said orifice lying in the central plane of the device is made larger that the diameter transverse to said plane, so that while the inside micrometer caliper may be inserted thereinto by inclining the latter. When the end of said inside micrometer caliper has been inserted into the bore 15 the stem thereof will bear against opposite edges of the orifice 18 and thereby be held securely against all movement within said orifice.

The space 14 is provided for the purpose of removing any dirt that may become lodged upon the stud 10 thereby insuring perfect contact between said stud and the end of the inside micrometer caliper.

My device may be made of any size, and constructed of any materials deemed convenient and suitable for a device of this character, and while I have illustrated and described a form of construction found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A micrometer device comprising a yoke; an arm projecting from said yoke; a contact member upon said arm; and means to mount an inside micrometer caliper upon said arm, one end of said caliper being in contact with said member.

2. A micrometer adapter comprising a yoke with an orifice therein; an arm projecting from said yoke; a stud upon said yoke; an adjustable stud upon said arm said studs and said orifice being alined; and an inside micrometer caliper mounted between said studs, and projecting through said orifice.

3. A device for adapting an inside micrometer caliper having a stem for use as an outside micrometer caliper, comprising a yoke; a stud to coact with the stem of said caliper; and means for mounting said inside micrometer caliper upon said yoke with the stem thereof alined with said stud.

4. A micrometer adapter comprising a yoke having an orifice in one end thereof and a stud alined with said orifice in the other end thereof; means to mount an inside micrometer caliper with the stem thereof slidable within said orifice; and means to longitudinally adjust said caliper relatively to said yoke.

In witness whereof I claim the foregoing as my own I hereunto affix my signature in the presence of two witnesses at Portland, county of Multnomah, State of Oregon, this 4th day of Dec. 1920.

HENRY JOHNSON.

Witnesses:
C. F. BLAKE,
PETER JOHNSON.